US008891936B2

(12) United States Patent
Barrett

(10) Patent No.: US 8,891,936 B2
(45) Date of Patent: Nov. 18, 2014

(54) METHOD AND DEVICE FOR OPTIMAL PLAYBACK POSITIONING IN DIGITAL CONTENT

(75) Inventor: Timothy Alan Barrett, Pymble (AU)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 13/634,984

(22) PCT Filed: May 7, 2010

(86) PCT No.: PCT/IB2010/001065
§ 371 (c)(1),
(2), (4) Date: Sep. 14, 2012

(87) PCT Pub. No.: WO2011/138628
PCT Pub. Date: Nov. 10, 2011

(65) Prior Publication Data
US 2013/0011116 A1 Jan. 10, 2013

(51) Int. Cl.
H04N 5/775 (2006.01)
H04N 5/783 (2006.01)
H04N 9/80 (2006.01)
G11B 27/10 (2006.01)
G11B 27/28 (2006.01)

(52) U.S. Cl.
CPC .............. H04N 5/783 (2013.01); G11B 27/105 (2013.01); G11B 27/28 (2013.01)
USPC 386/230; 386/241; 386/E5.052; 386/E9.011; 386/E5.07

(58) Field of Classification Search
USPC ............ 386/230, 241, E5.052, E5.07, E9.011
See application file for complete search history.

(56) References Cited

U.S. PATENT DOCUMENTS 8,479,229 B2 * 7/2013 Cansler et al. .................. 725/35
(Continued)

FOREIGN PATENT DOCUMENTS

| CN | 101025987 | 8/2007 |
| EP | 1251515 | 10/2002 |
| EP | 1748438 | 1/2007 |
| EP | 1887800 | 2/2008 |
| EP | 1986357 | 10/2008 |

(Continued)

OTHER PUBLICATIONS

Search report dated Jan. 12, 2011.

Primary Examiner — Thai Tran
Assistant Examiner — Nien-Ru Yang
(74) Attorney, Agent, or Firm — Robert D. Shedd; Vincent E. Duffy; Michael A. Pugel

(57) ABSTRACT

A method and device for optimal playback positioning in video content are provided. The present disclosure relates to a mechanism of tagging scenes or significant points in content in a prioritized way, and defines a mechanism to utilize this tagging associated with the content to facilitate stopping or starting at appropriate points for playback, e.g., when pressing a scene skip button to jump forward or back to another scene, or when pressing Play after inputting a fast-forward or rewind instruction. The method and device provide for displaying video content at a playback speed for viewing, receiving a first navigation instruction to navigate the video content at a speed faster than the playback speed for viewing, receiving a second navigation instruction to displaying of the video content, and determining a playback position of the video content based on at least one tagged frame of the video content.

26 Claims, 7 Drawing Sheets

(56) References Cited

U.S. PATENT DOCUMENTS

| | | |
|---|---|---|
| 2002/0167540 A1* | 11/2002 | Dobbelaar ............... 345/716 |
| 2003/0071971 A1 | 4/2003 | Jo |
| 2003/0152363 A1* | 8/2003 | Jeannin et al. ............ 386/68 |
| 2008/0037951 A1* | 2/2008 | Cho et al. ................. 386/68 |
| 2008/0266460 A1 | 10/2008 | Hirosawa |

FOREIGN PATENT DOCUMENTS

| | | |
|---|---|---|
| JP | 11112922 A | 4/1999 |
| JP | 2000354225 A | 12/2000 |
| JP | 2005293680 | 10/2005 |
| WO | WO9416442 | 7/1994 |
| WO | WO0062298 | 10/2000 |

* cited by examiner

METHOD AND DEVICE FOR OPTIMAL PLAYBACK POSITIONING IN DIGITAL CONTENT

REFERENCE TO RELATED PROVISIONAL APPLICATION

This application claims the benefit, under 35 U.S.C. §365 of International Application PCT/IB2010/001065, filed May 7, 2010, which was published in accordance with PCT Article 21(2) on Nov. 10, 2011 in English and further claims the benefit of U.S. provisional patent application No. 61/314,700, filed Mar. 17, 2010.

TECHNICAL FIELD OF THE INVENTION

The present disclosure generally relates to digital content systems and digital video recording systems, and more particularly, to a method and device for optimal playback positioning in digital video content.

BACKGROUND OF THE INVENTION

When using a digital video recorder (DVR), it is common to want to skip forward or back within in a piece of content, e.g., a movie or television program. Presently, however, there is no mechanism to determine the appropriate start or end point for a scene or appropriate points to begin playing the content. Many DVRs will simply begin playing where the user presses the Play button, though some have a mechanism whereby the playback start point is determined by how fast the fast-forward (FF) or rewind (Rew) was, assuming a fixed amount of delay, automatically skipping back a certain amount to compensate. In the best of the current implementations existing today, the content playback doesn't necessarily start on any kind of scene boundary, simply getting the user closer to where they are likely to want to be.

SUMMARY

A method and device for optimal playback positioning in digital video content are provided. The present disclosure relates to a mechanism of tagging scenes or significant points in content in a prioritized way, and defines a mechanism to utilize this tagging associated with the content to facilitate stopping or starting at appropriate points for playback, e.g., when pressing a scene skip button to jump forward or back to another scene, or when pressing Play after inputting a fast-forward (FF) or rewind (Rew) instruction.

According to one aspect of the present disclosure, a method for determining an optimal playback position in video content, the video content including a plurality of frames, is provided. The method including, inter alia, displaying video content at a playback speed for viewing, receiving a first navigation instruction to navigate the video content at a speed faster than the playback speed for viewing, receiving a second navigation instruction to resume displaying the video content at the playback speed for viewing, and determining a playback position of the video content, in response to the second navigation instruction, based on at least one tagged frame of the video content.

According to another aspect of the present disclosure, a device for playing back video content, the video content including a plurality of frames, is provided. The device includes, inter alia, a video processor for providing video content at a playback speed for viewing to a display device, a user interface for receiving a first navigation instruction to navigate the video content at a speed faster than the playback speed for viewing and receiving a second navigation instruction to resume displaying the video content at the playback speed for viewing, and a controller coupled to the user interface for receiving the second navigation instruction, determining a playback position of the video content based on at least one tagged frame of the video content and providing the determined playback position to the video processor.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
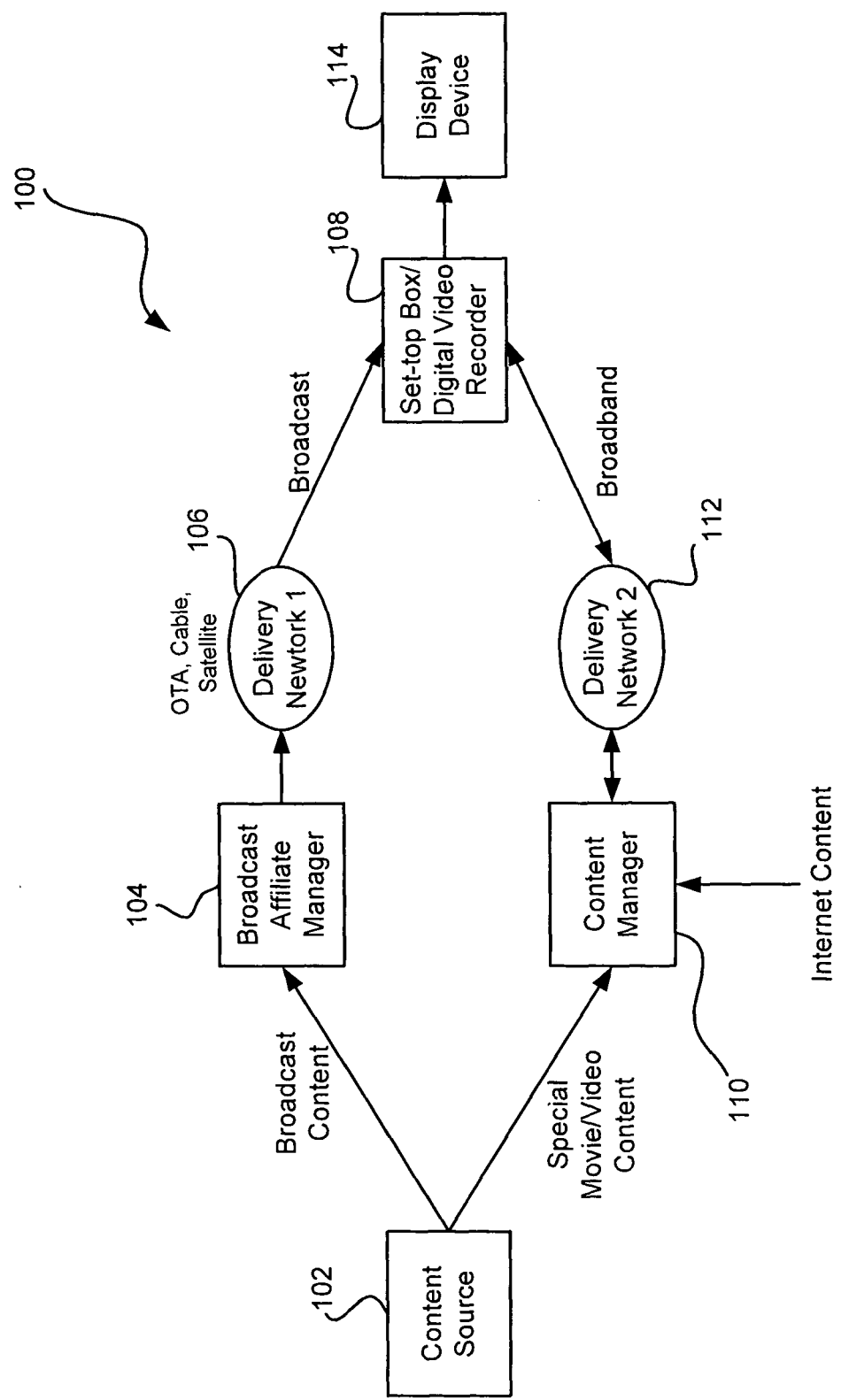
FIG. 1 is a block diagram of an exemplary system for delivering video content in accordance with the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures. may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A method and device for optimal playback positioning in digital video content are provided. The present disclosure relates to a mechanism of tagging scenes or significant points in content in a prioritized way, and defines a mechanism to utilize this tagging associated with the content to facilitate stopping or starting at appropriate points for playback, e.g., when pressing a scene skip button to jump forward or back to another scene, or when pressing Play after inputting a fast-forward (FF) or rewind (Rew) instruction.

Turning now to FIG. 1, a block diagram of an embodiment of a system 100 for delivering video content to the home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), NBC, CBS, etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a user's set top box/digital video recorder (DVR) 108 in a user's home.

A second form of content is referred to as special content. Special content may include content delivered as premium viewing, pay-per-view, or other content otherwise not provided to the broadcast affiliate manager. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's set top box/digital video recorder 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of Delivery network 1 (106). In addition, the user may also obtain content directly from the Internet via delivery network 2 (112) without necessarily having the content managed by the content manager 110.

The set top box/digital video recorder 108 may receive different types of content from one or both of delivery network 1 and delivery network 2. The set top box/digital video recorder 108 processes the content, and provides a separation of the content based on user preferences and commands. The set top box/digital video recorder may also include a storage device, such as a hard drive or optical disk drive, for recording and playing back audio and video content. Further details of the operation of the set top box/digital video recorder 108 and features associated with playing back stored content will be described below in relation to FIG. 2. The processed content is provided to a display device 114. The display device 114 may be a conventional 2-D type display or may alternatively be an advanced 3-D display.

Figure 2:
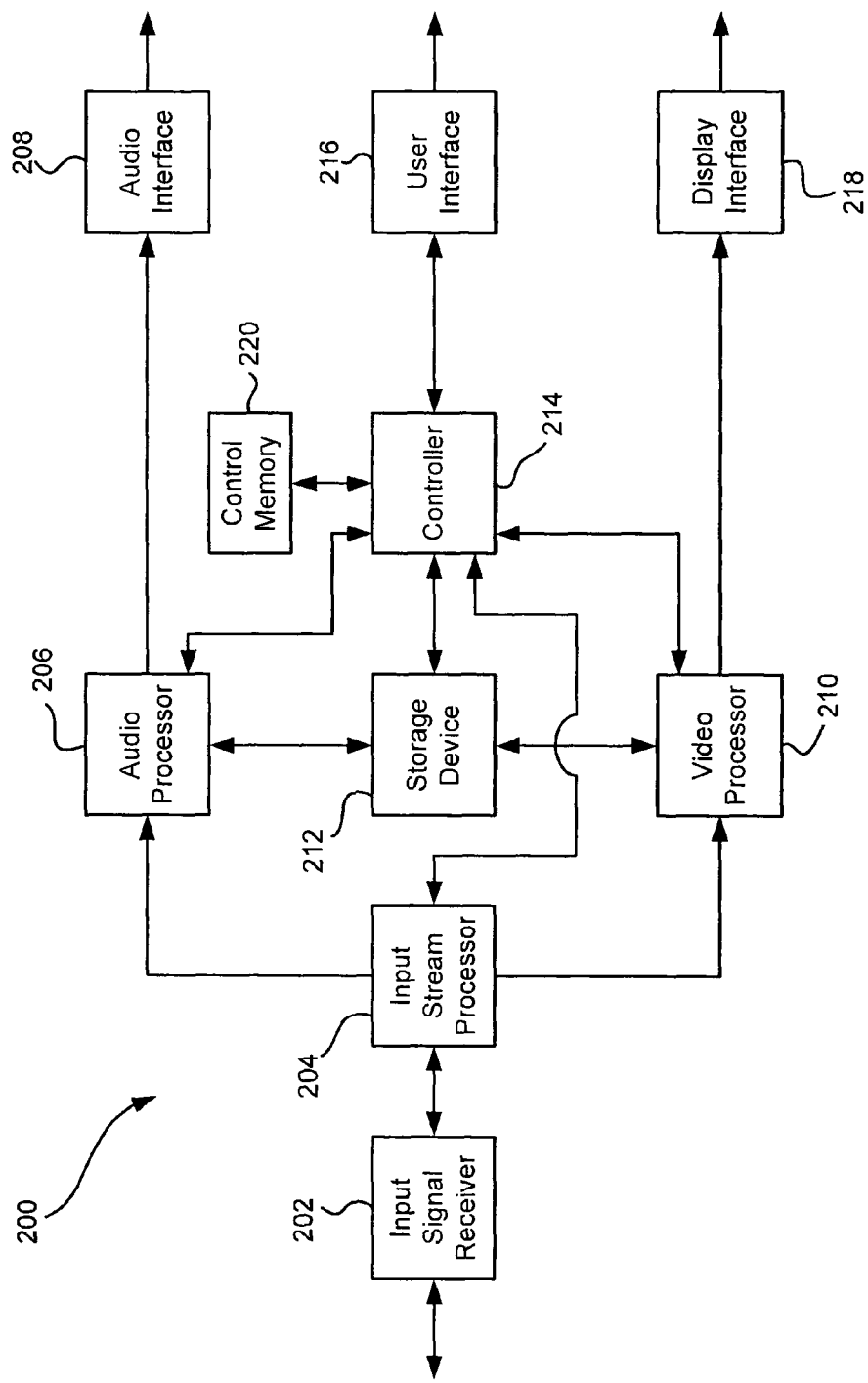
FIG. 2 is a block diagram of an exemplary set-top box/digital video recorder (DVR) in accordance with the present disclosure.

Turning now to FIG. 2, a block diagram of an embodiment of the core of a set top box/digital video recorder 200 is shown. The device 200 shown may also be incorporated into other systems including the display device 114 itself. In either case, several components necessary for complete operation of the system are not shown in the interest of conciseness, as they are well known to those skilled in the art.

In the device 200 shown in FIG. 2, the content is received in an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved in the input signal receiver 202 based on user input provided through a control interface (not shown). The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 114 or an audio amplifier (not shown). Alternatively, the audio interface 208 may provide a digital signal to an audio output device or display device using an HDMI (High-Definition Multimedia Interface) cable or alternate audio interface such as via a SPDIF (Sony/Philips Digital Interconnect Format). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 may be a hard disk drive, one or more large capacity integrated electronic memories, such as static random access memory, or dynamic random access memory, or may be an interchangeable optical disk storage system such as a compact disk drive or digital video disk drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as high definition multimedia interface (HDMI).

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. The controller 214 is further coupled to control memory 220 (e.g., volatile or non-volatile memory, including random access memory, static RAM, dynamic RAM, read only memory, programmable ROM, flash memory, EPROM, EEPROM, etc.) for storing information and instruction code for controller 214. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

A method for controlling fast-forward (FF) and rewind (Rew) functions in a video recording device is described below. The physical implementation of the algorithm or function may be done in hardware, such as discrete circuitry related to the video processor 210, or software, such as software residing in the control memory 220 and read and execute by the controller 214. The method involves analyzing the content to recognize and tag important points in the content that may represent the starts of scenes or other important reference points. Then, under a number of circumstances, the device 200 will be capable of automatically determining the right position to jump to, based on several criteria. The analysis may be done prior to broadcast, on ingest to the device or at playback, though the preferred implementation is likely to be upon ingest to the device or when the content is written to disk.

One practical example of the present disclosure is to make it simple for a user to easily start at the right point when pressing play after fast-forwarding through an ad (or advertisement) break or to easily rewind to the end of the previous ad break. In this case, the right start point, or playback position, would be determined by looking at the speed of the FF or Rew, when play button is pressed, the controller 214 will examine recently passed "tagged" positions, and make a determination if any scene tags and at what priority have recently been passed, in effect determining the proximity to a previously or dynamically recognized scene transition points that represent a valid point to start playing. In the case of a "Black Reference Frame", this could represent a significant marker (as black reference frames are used typically at the start and end of ad breaks), and if one has been recently been passed in the FF or REW, then this would be used as the start point. Alternatively, reference frames outside the regular intervals could also be tagged as less significant trigger points, as they may also represent the start of a scene.

The speed of the FF/Rew function needs to be considered along with the user reaction time to determine the area in which to search the content for tags. If the FF/Rew speed is fast, the user may have passed several reference points between seeing where they wanted to start playing and playback will need to start from the appropriate one. At slower speeds, it is likely that the last reference point passed will be the appropriate starting point.

The method and device of the present disclosure are predicated on having tags associated with the content so that when it is played back, information is available upon which to make a decision. This tag information could be obtained on one of three primary modes of operation. First, content could be pre-analyzed at the head end of the broadcast affiliate manager 104 or content manager 110 and have metadata broadcast along with it. This could be implemented by putting the tagging data as part of the SI data in the transport stream and sending the tagging data along with the content so there is no work at the DVR or device 200. Second, content could be analyzed and tagged as it flows in to the device 200 or as it is written to disk. Third, content could be analyzed dynamically upon playback and/or during trick mode operation so that reference points are created dynamically. For example, as a user fast-forwards or rewinds, the device is actually doing some frame analysis on either direction as the content is passing through. Each mode of tagging will now be further described.

In the first mode of tagging frames of the video content, tagging will be performed at the headend before the content is transmitted over a delivery network. Broadcasters are unlikely to support the tagging of content (particularly as it relates to the potential of skipping adds) due to the potential loss of revenue. However, the concept of actually having this capability at the encoder itself presents other opportunities, as there are also other implications of being able to have scene detection. If scene tagging existed in the stream itself, several possibilities emerge including, for example, tagging preferred commercials to indicate they can't be skipped. In a typical embodiment, the headend may not be relevant as the device 200 is likely to have a digital terrestrial tuner, so, like any other DVR, the device 200 is being fed content that it is processing on the fly. In an alternate embodiment, however, the headend may also be used to receive streamed, pre-prepared content. In this instance, using a similar solution, it may be an advantage to have some sort of enhanced scene detection within the film. For example, the broadcaster might want to have content having a very long GOP (group of pictures), with a high maximum I-frame interval. In this instance, having tagging done at the headend may be of value and facilitate playback and searching through the content.

In the second mode of tagging frames of the video content, the tagging will occur during ingest to the set-top box 200 by the video processor 210, i.e., where the content is received and/or written to a disk, hard drive or other memory device. The point at which content is being ingested into the device and/or being processed and written to disk is likely to be the optimal point at which to analyze the content and provide tagging. The level of processing will vary depending on requirements, and be as simple as just tagging non-regularly spaced I-Frames, and "Black" I-frames or involve more sophisticated scene detection. There are considerations as to how much additional disk space can be used and much additional information should be stored. In one embodiment, when scenes are detected, thumbnails of the frame starting the scene may also be captured to allow a graphical based browsing of the content.

The third mode of tagging frames involves tagging content in real time. In the case where content is not pre-tagged, the video processor 210 can perform scene analysis where the scene analysis can be done on the fly during fast-forwarding and rewind events. In the event the user does a fast-forward or rewind, the video processor 210 essentially does the tagging on the fly, keeping counters as to where the appropriate scene points are. When the user presses play, the algorithms or functions described below will be applied to jump to the appropriate tag position.

In all cases, the tagging of content will be implemented as an automated solution that is completely invisible to the user, though there are potentially significant variations in how much information is tagged, what is used to determine those tags and how the tags are used. In one embodiment, the tags may constitute a very small amount of data that defines the key transition points in the file. For example, for a two-hour program which had six ad breaks, the start and end of those ad breaks could be defined by analyzing the scene changes where you have a black reference frame.

The process of detecting tag points in the video content will now be described. In the process of compressing video, an I-frame will typically be inserted every half a second or second, and there are a few interspersed I-frames that represent scene changes. As I-frames are typically spaced at regular intervals, in addition to the scene changes, one difficulty is that is a scene may change on a regular interval I-frame, making it difficult to identify as a new scene. It is relatively simple to calculate the actual maximum I-Frame interval of the content, as looking through a short history will reveal I-Frames at least every N frames. If, for example, the content has a maximum GOP size of ½ a second, there would be a minimum of 100 I-frames in every 50 seconds. However, due to additional I-Frames for scene changes, there may be, for example, 110 I-frames per 50 second period. From this we can still deduce the interval is roughly X or roughly half a second but there is additional I-frames in addition that represent scene changes.

The actual methodologies for detecting appropriate frames for tagging are relatively well known to those skilled in the art. For instance in a known approach, motion picture video content data is generally captured, stored, transmitted, processed, and output as a series of still images. Small frame-by-frame data content changes are perceived as motion when the output is directed to a viewer at sufficiently close time intervals. A large data content change between two adjacent frames is perceived as a scene change (e.g., a change from an indoor to an outdoor scene, a change in camera angle, an abrupt change in illumination within an image, and the like).

Encoding and compression processes take advantage of small frame-by-frame video content data changes to reduce the amount of data needed to store, transmit, and process video data content. The amount of data required to describe the changes is less than the amount of data required to describe the original still image. Under standards developed by the Moving Pictures Experts Group (MPEG), for example, a group of frames begins with an intra-coded frame (I-frame) in which encoded video content data corresponds to visual attributes (e.g., luminance, chrominance) of the original still image. Subsequent frames in the group of frames, such as predictive coded frames (P-frames) and bi-directional coded frames (B-frames), are encoded based on changes from earlier frames in the group. New groups of frames, and thus new I-frames, are begun at regular time intervals to prevent, for instance, noise from inducing false video content data changes. New groups of frames, and thus new I-frames, are also begun at scene changes when the video content data changes are large because less data is required to describe a new still image than to describe the large changes between the adjacent still images. In other words, two pictures from different scenes have little correlation between them. Compression of the new picture into an I-frame is more efficient than using one picture to predict the other picture. Therefore, during content data encoding, it is important to identify scene changes between adjacent video content data frames.

The method and device of the present disclosure may detect scene change by using a Sum of Absolute Histogram Difference (SAND) and a Sum of Absolute Display Frame Difference (SADFD). Such methods use the temporal information in the same scene to smooth out variations and accurately detect scene changes. These methods can be used for both real-time (e.g., real-time video compression) and non-real-time (e.g., film post-production) applications.

In another embodiment of the present disclosure, there are several levels of tags, i.e., the tags are assigned a weight or priority. In this embodiment, the search zones within the content have more of an impact. Levels may, for example, be:
Blank Reference Frames (highest priority)
   1) Non-Regular Reference frames (Secondary priority but represent scene changes)
   2) Other (optional)

Typically, when playing back stored content, the playback would commence from a reference frame, though the tagging allows a better estimate of what frames the user is most likely to want to start from. If a priority 1 frame is found in the primary or secondary search zone, then playback will begin here. If a priority 1 frame is found in the primary zone, no further searching will take place. If there is no priority 1 tagged frame in the primary or secondary zones, the $2^{nd}$ priority tag closest to the center is selected for the start position. There may be "other" tags that need to be considered, as a tertiary priority in the same way as the priority 2 tags, though in the absence of any of these, the reference frame closest to the center of the primary search zone will be selected as the starting position.

The process of playing back the video content using tags or tagged frames will now be described. In one embodiment, in the case of video playback with pre-tagged content, assume that there is a content file on the disk or storage device 212 that has been tagged or a separate file that is associated with the content file that contains the tagging information. The tagging information will indicate the scene points generally within the video content file, and in particular would have weighted tags for how important these markers are as reference points. There are several possible tags types such as a defined "look-up point", regular interval I-frame (reference frame), off-interval I-frame (representing a new scene), and also a blank I-frame. Blank (black) I-frames would have a very low data rate as they contain little data, and are generally inserted between ad-breaks, indicating transition from a commercial to the beginning of a scene or between scenes, for example.

Figure 3:
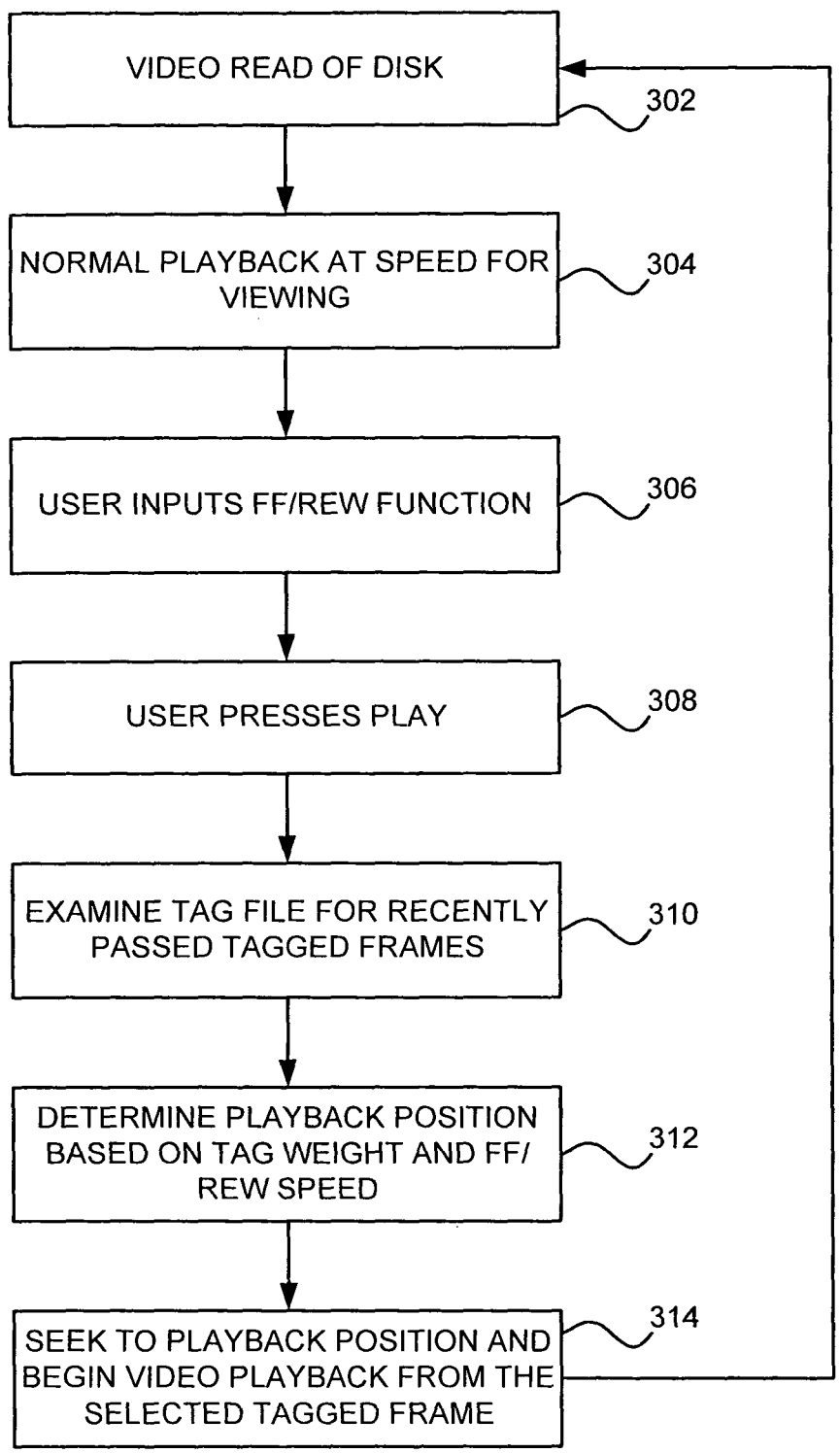
FIG. 3 is a flowchart of an exemplary method for playing back content in an environment when the content has been pre-tagged in accordance with the present disclosure.

The flow chart shown in FIG. 3 represents the process flow of playing back content in an environment when the content has been pre-tagged either prior to broadcast of the content or as it was ingested into the DVR device 200 or written to disk. If the information is being read off the disk, such as a hard drive disk (step 302), normal playback occurs at a speed for viewing (304). During normal playback, a user may input a navigation instruction via user interface 216, e.g., fast-forward or rewind the content (step 306). It is to be appreciated that the navigation instruction, e.g., a fast-forward (FF), rewind (Rew), skip scene, etc., will cause the user to navigate the video content at a speed faster than the normal playback speed for viewing.

When the user inputs a fast-forward or rewind, no additional processing takes place until the user presses play again, i.e. a subsequent navigation instruction. Once the user presses play after a fast-forward or rewind (step 308), the controller 214 will examine the tagged information and determine what tags have occurred within the appropriate scope of the position at which the user pressed play (step 310). Then, the controller 214 will make a determination where to jump to, to start playback, based on a tag weight and FF/Rew speed (step 312). Once the playback position is determined, the video processor 210 will seek the play head to that point and begin video playback from the selected tagged frame (step 314).

Figure 4:
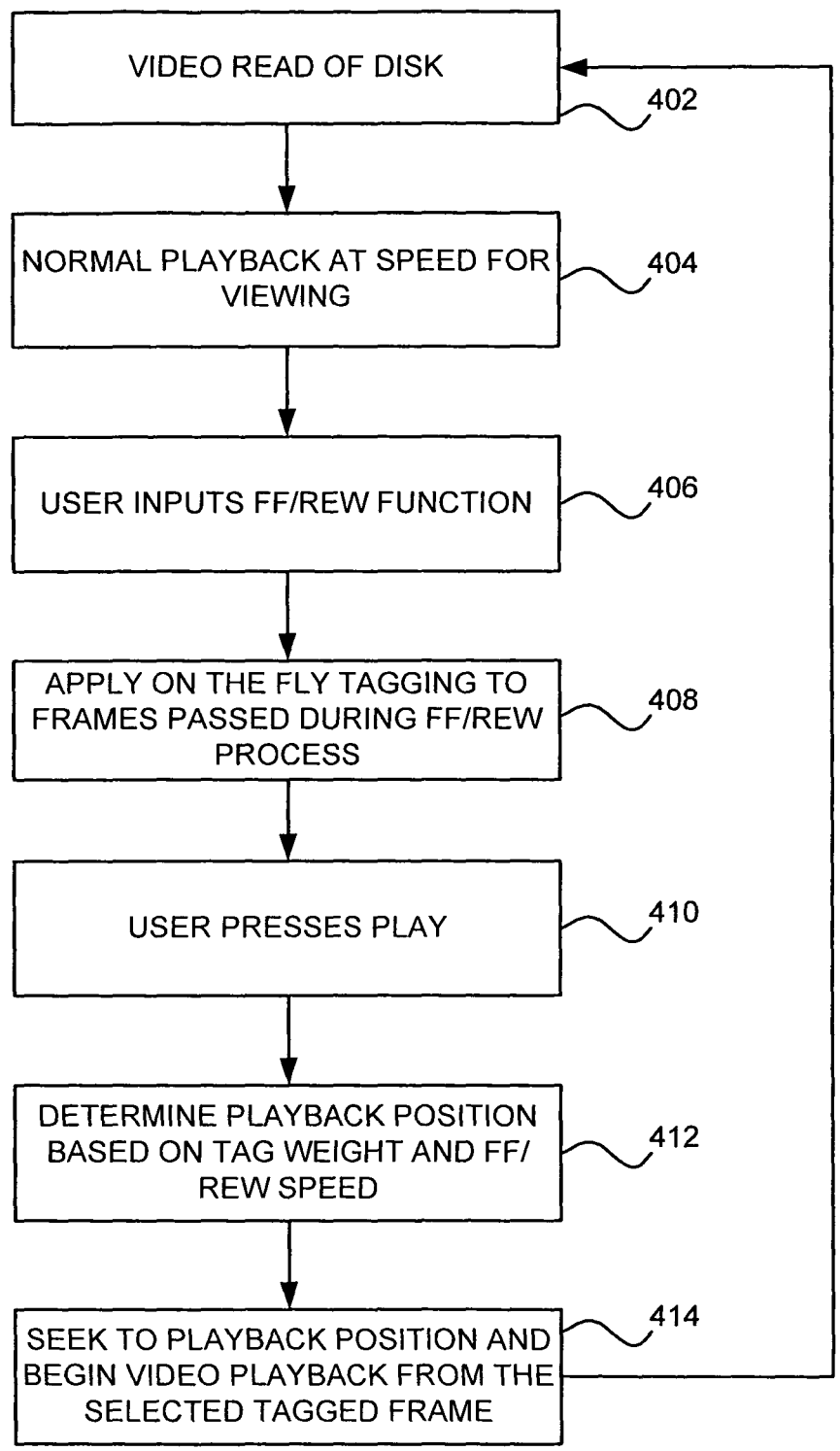
FIG. 4 is a flowchart of an exemplary method for playing back content in an environment when the content is dynamically tagged in accordance with the present disclosure.

In an alternate embodiment as shown in FIG. 4, the playback process itself could be used to effectively dynamically tag the content. As described above, initially in step 402, the content will be read from the disk and normal playback will occur (step 404). When the user performs a FF/Rew, i.e., inputs a navigation instruction (step 406), the video processor 210 will apply dynamic or "on-the-fly" frame tagging (step 408). That is, the device will detect blank scenes, references frames, etc., as passed during the FF/Rew process. These detect frames or points of reference will be tagged. These tags may or may not be stored along with the content for later use.

Once the user presses play after a fast-forward or rewind (step 410), the device 200 will proceed as described above. The controller 214 will make a determination where to jump to, to start playback, based on a tag weight and FF/Rew speed (step 412). Once the playback position is determined, the video processor 210 will seek the play head to that point and begin video playback from the selected tagged frame (step 414).

In addition to supporting a process of fast-forwarding or rewinding through content, the tagging can also be used to provide a better or different experience for users to be able to skip from "Scene to Scene" with a press of a button, or skip a larger amount of content (with a pre-defined base time period), though still begin playback on a scene boundary as defined in the tags. This process is shown in FIG. 5.

Figure 5:
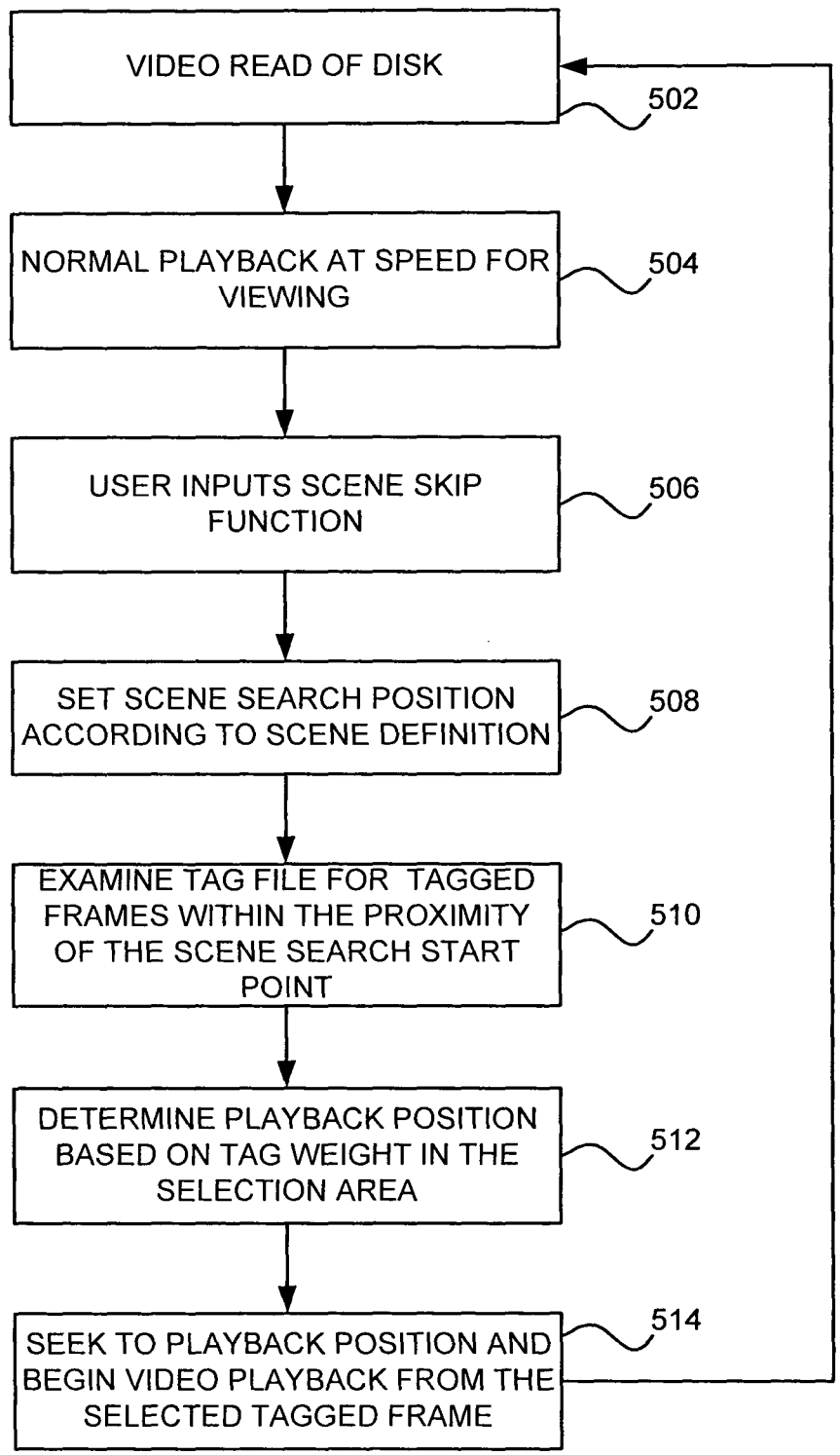
FIG. 5 is a flowchart of an exemplary method for playing back content and navigating the content with a scene skip function in accordance with the present disclosure.

Referring to FIG. 5, video is read from the disk (step 502) and normal playback occurs at a speed for viewing (step 504). Upon the user requesting a "scene skip" function, i.e., inputting a navigation instruction, in step 506, the controller 214 will set a "scene search" position according to a predefined "scene definition" setting (step 508), i.e., jump forward or backward a fixed amount of time to begin scene search. Next, in step 510, the controller 214 will examine the tag information for tagged frames within the proximity of the "scene search" start point. Then, the controller 214 will make a determination where to jump to, to start playback, based on a tag weight in the selection area (step 512). Once the playback position is determined, the video processor 210 will seek the play head to that point and begin video playback from the selected tagged frame (step 514).

Figure 6:
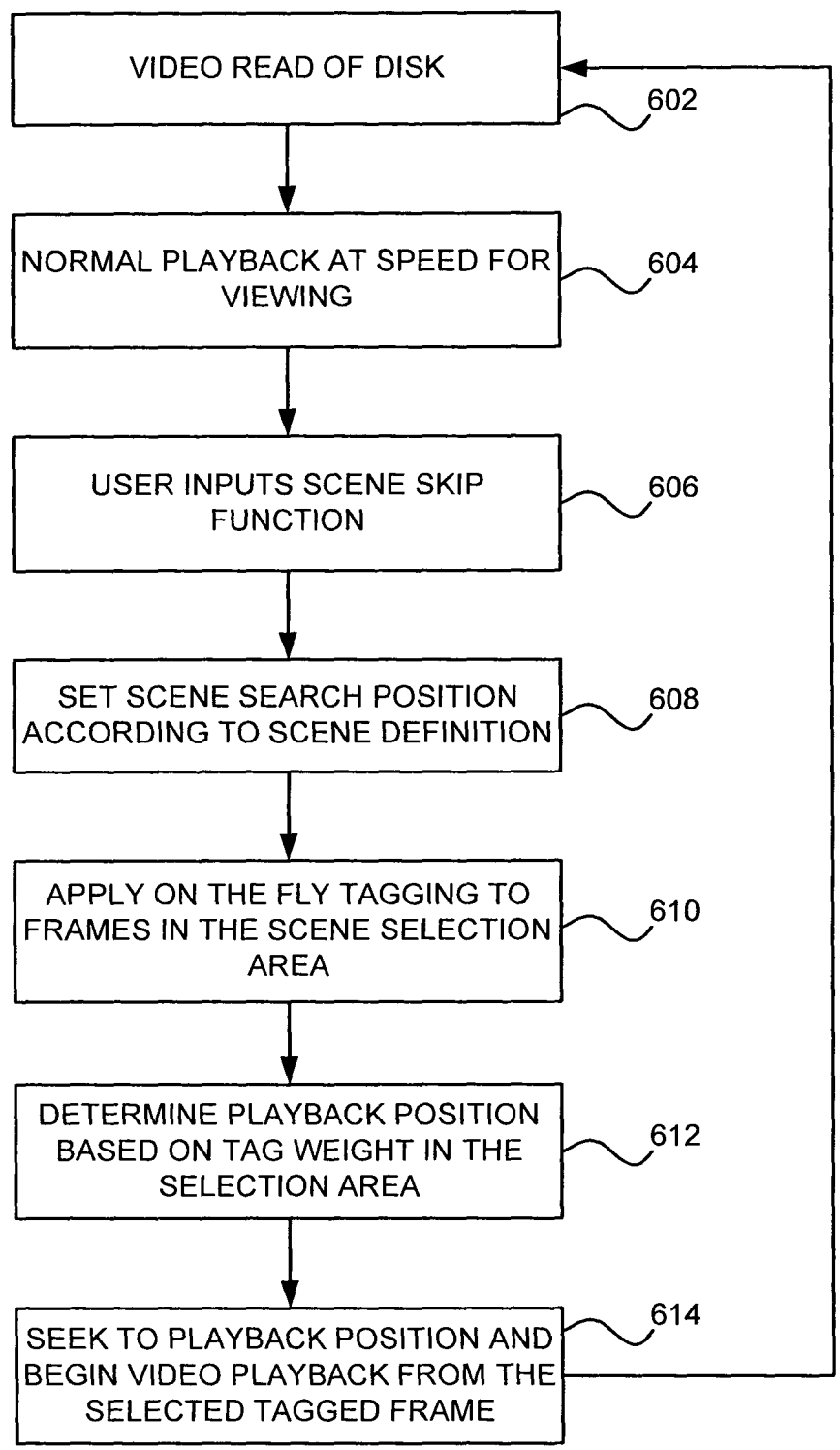
FIG. 6 is a flowchart of an exemplary method for playing back content and navigating the content with a scene skip function in accordance with another embodiment the present disclosure.

In addition to being able to perform scene skipping with tagged content, the device 200 also performs scene skipping dynamically with content that has not been pre-tagged, as shown in FIG. 6. As described above, video is read from the disk (step 602) and normal playback occurs at a speed for viewing (step 604). Upon the user requesting a "scene skip" function in step 606, the controller 214 will set a "scene search" position according to a predefined "scene definition" setting (step 608), i.e., jump forward or backward a fixed amount of time to begin scene search. Next, in step 510, the controller 214 will examine the tag information for tagged frames within the proximity of the "scene search" start point. The video processor 210 will apply dynamic or "on-the-fly" frame tagging (step 610). That is, the video processor 210 will detect blank scenes, references frames, etc., as passed during the scene skip process. These detect frames or points of reference will be tagged. These tags may or may not be stored along with the content for later use. Then, the controller 214 will make a determination where to jump to, to start playback, based on a tag weight in the selection area (step 612). Once the playback position is determined, the video processor 210 will seek the play head to that point and begin video playback from the selected tagged frame (step 614).

The function of how to determine the appropriate playback position after a user presses play will now be described. To determine the appropriate position to begin playback, the controller 214 will set a start point based on one of a number of factors, then specify a period or zone in which to search either direction from that reference point. The controller 214 will then search to see what tags fall within that range and apply an algorithm or function to determine the most appropriate start point for playback.

While the play start position is likely to be a reference frame of some form, it is also possible to key off an alternate pre-defined time stamp, which could also be other than a reference frame. Indeed, as part of the tagging mechanism a facility to say this is other than an I-frame, say a B-frame, but it is a B-frame that is easily buildable from the last four frames. If the start position for playback is here, the tag could contain data (or a reference to the data) to allow the device to go back several frames to get back into all the video data that is needed to build this non-reference frame and treat it as such. In this instance, the tag would likely contain the offset information required to make it quicker and easier to get the data required rather than have to calculate it from scratch on the fly.

In another embodiment, in the case where the video compression had resulted in a very long GOP, e.g., 10 seconds, the present disclosure provides mechanisms to get reference frames from somewhere else so the device and method can actually support the fast forward and rewind with such video by augmenting it with external data, dynamically getting additional frames from the internet or some other medium and/or source. In this example, the stream has minimal reference frames, and there would be another source of the rest of the I-frames or intervening data required to build complete frames.

DVRs typically employ algorithms or functions where during trick mode playback, the DVR will jump from I-frame to I-frame or determine which reference frames are to be displayed. The present disclosure expands on this basic idea so that rather than just referencing I-frames, there are multiple possible points at which the DVR may stop, which will nominally be defined as a scene. While the tags define possible points from which to start playback, an algorithm or function is applied to determine the time interval within the content in which to search for these tags, and which tag represents the optimal start point within that content.

Figure 7:
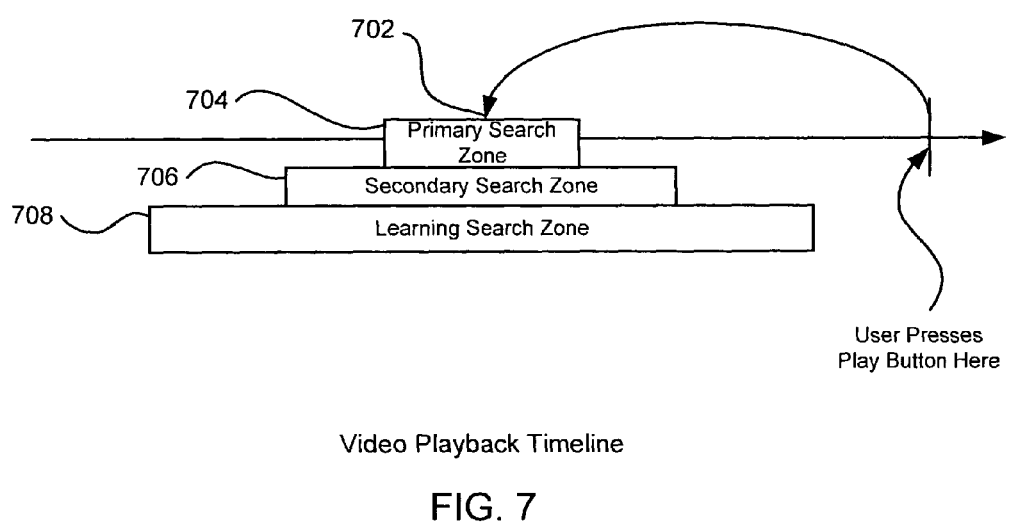
FIG. 7 illustrates a video playback timeline and how various zones are determined to be searched for tagged frames of video content in accordance with the present disclosure.

In this implementation, the start and end positions for any playback position search are bounded by the position in the content file at which the user started the fast-forward/rewind, i.e., input a first navigation instruction, and where they pressed play i.e., input a second navigation instruction. No searching will occur outside these boundaries. To determine the start position for the tag search, the controller 214 will calculate both a "search position" (in the center of the search area), and a size of the area (or zone) in which to search for tags as illustrated in FIG. 7.

When the user presses the play button while performing a FF or Rew, a search start position is defined in the file based on the following criteria: 1) the speed at which the user is doing the FF/Rew and 2) a nominal reaction time assigned to the user. The reaction time of the user may initially be set at 2-5 seconds and can be modified according to user input and/or experience of the device 200 as to actual likely reaction times, as will be described in detail below.

To give an example, the user is FF at 30× real speed and presses play 43 minutes and 10 seconds into the file (43:10). Assume the user has an assigned reaction time of 4 seconds. This means that the central position 702 for the search would be 4×30 seconds (i.e. 2 minutes) before the position where the user pressed play (i.e., 41:10). The search for tagged frames would therefore start at this position, with primary search zone 704 being a fixed percentage of this distance on either side of the center point 702. Assume this is 50%, the tag search zone would be 1 minute either side of the central point, i.e. between 40:10 and 42:10 in the file. If any priority tagged frame is found within this range, a hit is registered and the video playback will commence from the tagged frame having the highest priority. If more than one match is found and the weight of the tag priorities is the same, the playback will commence from the point closest to the center position 702. When any match is made, the user's reaction time may also be measured and potentially used to alter the expected response time for future searches.

If no match is found, a secondary zone 706 will also be searched, this may be, for example 100% of the distance from the position at which the user pressed play, to the center point 702. If a key tag is found in this search, this may indicate that the user's reaction was abnormal, and if a key frame exists in this area, it can still be selected as the start position.

The final learning search zone 708 extends from the central point 702 to the play position, and 200% from the central point back. This will only be searched in the case that no key frame was found in either of the first 2 zones. If a key tagged frame is found here, the delay can be recorded, and if this is constant behavior, the reaction time of the user may be adjusted to ensure that the key frame lands in the primary zone more often. Note that the percentages of the distance from the central point are illustrative only, and will be better determined through user profiling. In addition, regardless of the percentage, the search will take place within the extreme bounds of the search as described earlier.

To determine the user's reaction time, the device 200 will employ both automated and manual mechanisms. This may include a user preference that lets users define and/or test their own reaction time. A typical reaction time might be two seconds for example, so at the user fast-forwards through the content, it will take a certain amount of time from when the users see the point at which they would like to start playing, before they press the play button. In an example where the user has a 2 second reaction time and is fast-forwarding at 30× normal playback, a minute worth of video will pass between what triggered the user to press play, and them actually doing so. If the FF rate was, for example, only 2× normal playback, only 4 seconds of video would have passed in this time. The user's reaction time will be highly variable, with a slow reaction time being around 5 seconds, and a fast reaction time is probably half a second.

The device 200 will determine if the user's reaction time is fast or not. As a rule of thumb, default values will be used to set the average user response based on testing. Additionally, the device 200 may provide a user-interface for user's to configure their reaction time, and/or have it calculated dynamically. If the device were to define a default time for the average user of, say 2 seconds, it can then build up a record of how the user actually does react over time, e.g., based on testing if there are high priority "Blank Frame" tags, found consistently within a unusually long distance from when the user presses play. The response time may also be connected to a user based system on the device 200 such that separate profiling may be conducted for multiple users of the system.

Manual reaction time may be set using a traditional slider displayed on the display device 114. Another option is a mechanism to determine the reaction speed of the user, by, for example, showing a series of images in random order, and ask the user to press the play button when they see a particular image (such as a picture of a dog, for example), then measuring the time between when the image was displayed and when the user pressed play. The test may be repeated multiple times to gain better accuracy, and may be user specific (i.e. the system may allow a user to identify themselves individually, both from a testing perspective and for using the device).

Although embodiments which incorporate the teachings of the present disclosure have been shown and described in detail herein, those skilled in the art can readily devise many other varied embodiments that still incorporate these teachings. Having described preferred embodiments of a method and device for optimal playback positioning in digital content (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. A method for determining an optimal playback position in video content, the video content including a plurality of frames, the method comprising:

displaying video content at a playback speed for viewing;

receiving a first navigation instruction to navigate the video content at a speed faster than the playback speed for viewing;

receiving a second navigation instruction to resume displaying the video content at the playback speed for viewing; and determining a playback position of the video content, in response to the second navigation instruction, by determining a search start position within frames passed in a time period between receiving the first and second navigation instructions and selecting a first search area for searching for at least one tagged frame, the first search area including a predetermined time of the video content on both sides of the determined search start position.

2. The method as in claim 1, where the at least one tagged frame of the video content is tagged before the displaying step.

3. The method as in claim 1, further comprising dynamically tagging at least one frame of the video content as frames are passed in the time period between receiving the first and second navigation instructions.

4. The method as in claim 1, wherein the search start position is based on a speed of the first navigation instruction.

5. The method as in claim 4, wherein the search start position is further based on a reaction time assigned to a user.

6. The method as in claim 5, wherein if at least two tagged frames are within the first search area, further comprising selecting a tagged frame with the highest priority as the playback position.

7. The method as in claim 6, wherein if no tagged frames are within the first search area, further comprising selecting a second search area, the second search area being larger than the first search area.

8. The method as in claim 7, wherein if no tagged frames are within the first area and second search area, further comprising:
 selecting a third search area, the third search area being larger than the second search area;
 upon determining the at least one tagged frame in the third search area, adjusting the reaction time assigned to the user; and
 increasing the number of the predetermined time of the first search area.

9. The method as in claim 1, wherein the first navigation instruction is a fast-forward function or rewind function.

10. The method as in claim 9, wherein the second navigation instruction is a play function.

11. The method as in claim 1, wherein the first navigation instruction is a scene skip function.

12. The method as in claim 11, wherein the determining step further comprises:
 determining a search start position by moving forward or backward a predetermined amount of time from the time of receiving the first navigation instruction; and
 searching for at least one tagged frame in proximity of the search start position.

13. The method as in claim 12, wherein if at least two tagged frames are within the first search area, further comprising selecting a tagged frame with the highest priority as the playback position.

14. A device for playing back video content, the video content including a plurality of frames, the device comprising:
 a video processor for providing video content at a playback speed for viewing to a display device;
 a user interface for receiving a first navigation instruction to navigate the video content at a speed faster than the playback speed for viewing and receiving a second navigation instruction to resume displaying the video content at the playback speed for viewing; and
 a controller coupled to the user interface for receiving the second navigation instruction, determining a playback position of the video content by determining a search start position within frames passed in a time period between receiving the first and second navigation instructions and selecting a first search area for searching for at least one tagged frame, the first search area including a predetermined time of the video content on both sides of the determined search start position, the controller further providing the determined playback position to the video processor.

15. The device as in claim 14, wherein the video processor tags the at least one tagged frame of the video content before storing the video content in a storage device.

16. The device as in claim 14, wherein the video processor dynamically tags the at least one frame of the video content as frames are passed in the time period between receiving the first and second navigation instructions.

17. The device as in claim 14, wherein the search start position is based on a speed of the first navigation instruction.

18. The device as in claim 17, wherein the search start position is further based on a reaction time assigned to a user.

19. The device as in claim 18, wherein if at least two tagged frames are within the first search area, the controller selects a tagged frame with the highest priority as the playback position.

20. The device as in claim 19, wherein if no tagged frames are within the first search area, the controller selects a second search area, the second search area being larger than the first search area.

21. The device as in claim 20, wherein if no tagged frames are within the first and second search areas, the controller selects a third search area, the third search area being larger than the second search area,
 wherein upon determining the at least one tagged frame in the third search area, the controller adjusts the reaction time assigned to the user and increases the number of predetermined time of the first search area.

22. The device as in claim 14, wherein the first navigation instruction is a fast-forward function or rewind function.

23. The device as in claim 22, wherein the second navigation instruction is a play function.

24. The device as in claim 14, wherein the first navigation instruction is a scene skip function.

25. The device as in claim 24, wherein the controller is further configured for determining a search start position by moving forward or backward a predetermined amount of time from the time of receiving the first navigation instruction and searching for at least one tagged frame in proximity of the search start position.

26. The device as in claim 25, wherein if at least two tagged frames are within the first search area, the controller selects a tagged frame with the highest priority as the playback position.

* * * * *